United States Patent
Prasad et al.

(10) Patent No.: US 10,134,042 B1
(45) Date of Patent: Nov. 20, 2018

(54) AUTOMATED VEHICLE OWNERSHIP SUPPORT

(71) Applicant: United Services Automobile Association ("USAA")

(72) Inventors: Bharat Prasad, San Antonio, TX (US); Charles L. Oakes, III, Boerne, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 488 days.

(21) Appl. No.: 14/879,828

(22) Filed: Oct. 9, 2015

Related U.S. Application Data

(63) Continuation-in-part of application No. 14/693,176, filed on Apr. 22, 2015, and a continuation-in-part of
(Continued)

(51) Int. Cl.
*G06Q 30/00* (2012.01)
*G06Q 10/00* (2012.01)

(52) U.S. Cl.
CPC .................. *G06Q 30/016* (2013.01)

(58) Field of Classification Search
CPC ........... G06Q 30/0206; G06Q 30/0283; G06Q 30/016
(Continued)

(56) References Cited

U.S. PATENT DOCUMENTS 7,197,638 B1 * 3/2007 Grawrock et al. ........................... G06F 2221/2141 713/165
8,065,342 B1 * 11/2011 Borg et al. .......... Y10S 707/944 707/803
(Continued)

OTHER PUBLICATIONS

Newsbyte: SAP, toyota InfoTechnology center and VeriFone connect cars and provide drivers with simplified fueling. (Jul. 1, 2014). PR Newswire Retrieved from https://dialog.proquest.com/professional/docview/1542411760?accountid=142257 (Year: 2014).*

*Primary Examiner* — Beth V Boswell
*Assistant Examiner* — Folashade Anderson
(74) *Attorney, Agent, or Firm* — Baker Hostetler LLP

(57) ABSTRACT

A computer system for processing vehicle ownership support data includes an infrastructure platform which includes a plurality of hardware and software components, infrastructure services, APIs, and SDKs adapted to communicate in a communication network. The infrastructure platform receives telematics data such as vehicle identification data, driving performance data, vehicle operation data and vehicle sensor data for a corresponding vehicle. Such telematics data can be received from a vehicle device (Onboard Device (OBD)), or from a cloud-based telematics platform. The infrastructure platform identifies vehicle ownership support services associated with the at least one vehicle and analyzes the received telematics data associated with the identified services. The infrastructure platform provides vehicle ownership support services to a mobile application accessible at
(Continued)

a customer's mobile device associated with the vehicle or the customer. Such services may include, without limitations, automated fuel dispensing, emergency roadside assistance, vehicle maintenance and repair assistance, and the like.

14 Claims, 11 Drawing Sheets

Related U.S. Application Data application No. 14/689,747, filed on Apr. 17, 2015, and a continuation-in-part of application No. 14/687,557, filed on Apr. 15, 2015.

(58) Field of Classification Search
USPC .......................................................... 705/7.35
See application file for complete search history.

(56) References Cited

U.S. PATENT DOCUMENTS

| | | | | |
|---|---|---|---|---|
| 8,912,924 | B2* | 12/2014 | Scofield | G07B 15/04 340/932.2 |
| 9,845,050 | B1* | 12/2017 | Garza et al. | B60Q 9/00 |
| 2003/0114965 | A1* | 6/2003 | Fiechter et al. | G05B 23/02 701/29.3 |
| 2015/0088613 | A1* | 3/2015 | Pierce, Jr. et al. | G06Q 30/0206 705/7.35 |
| 2015/0286362 | A1* | 8/2015 | Chandaria et al. | G06F 8/60 715/803 |
| 2017/0287237 | A1* | 10/2017 | Koenig | G07C 5/0808 |

* cited by examiner

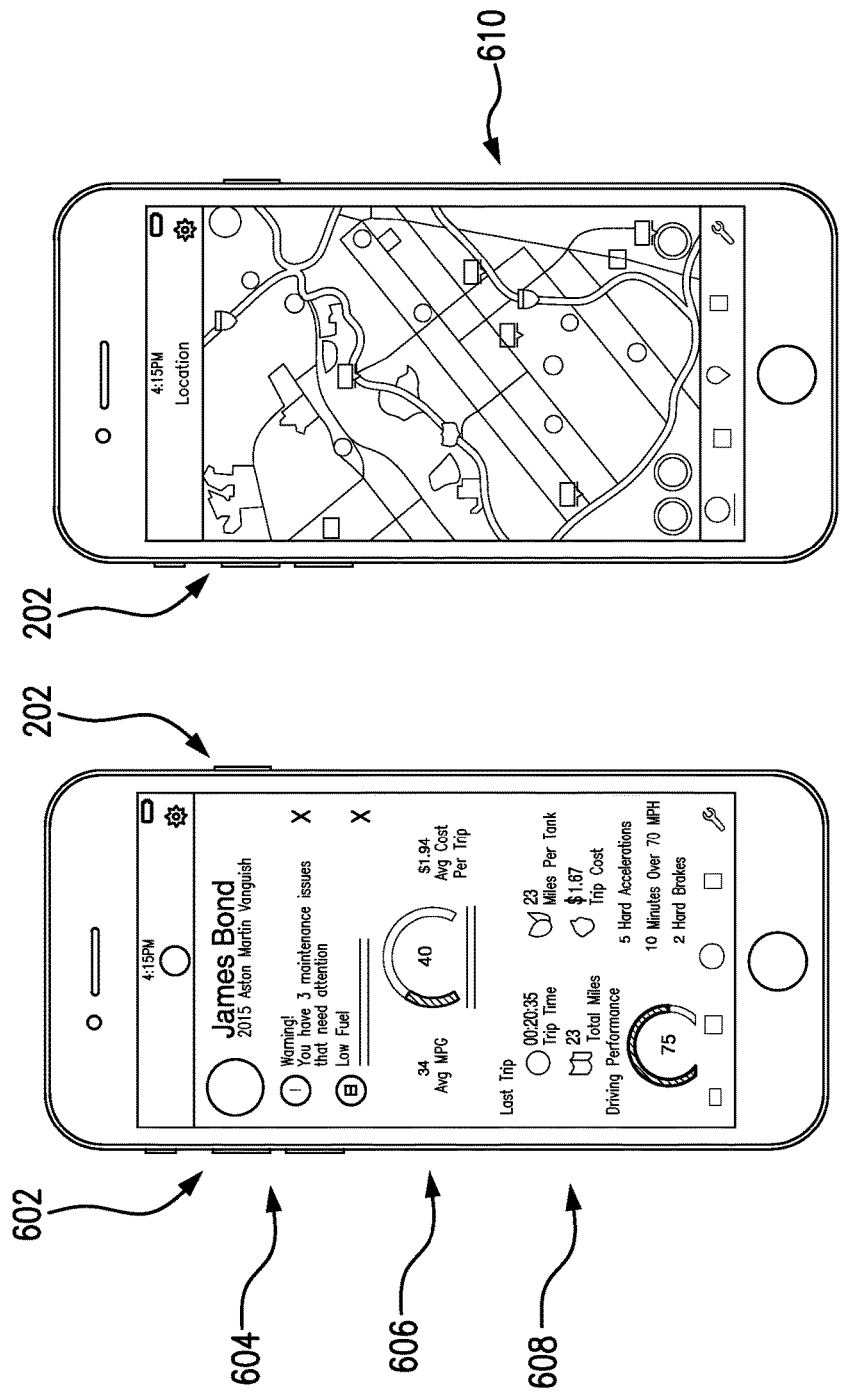

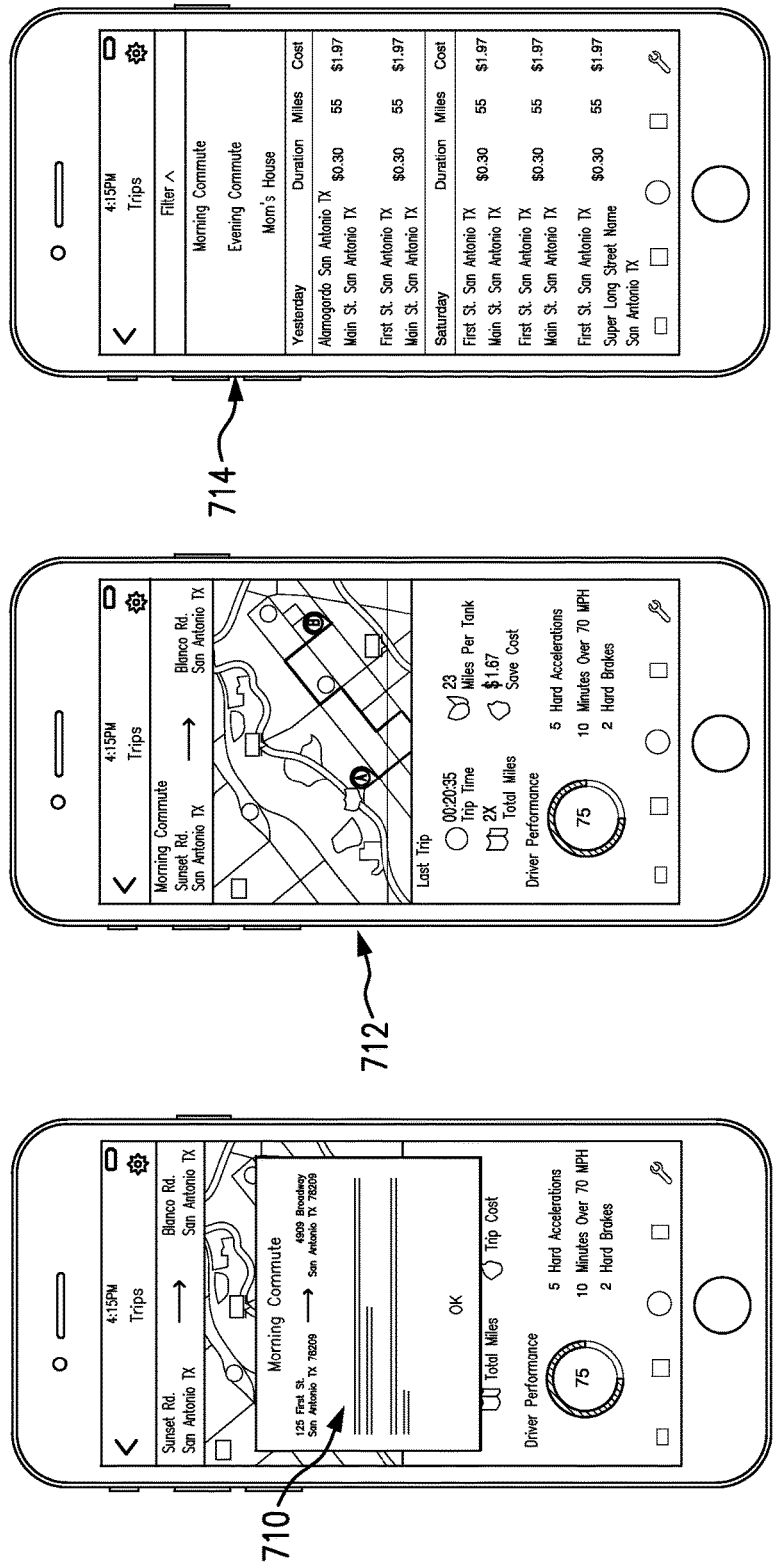

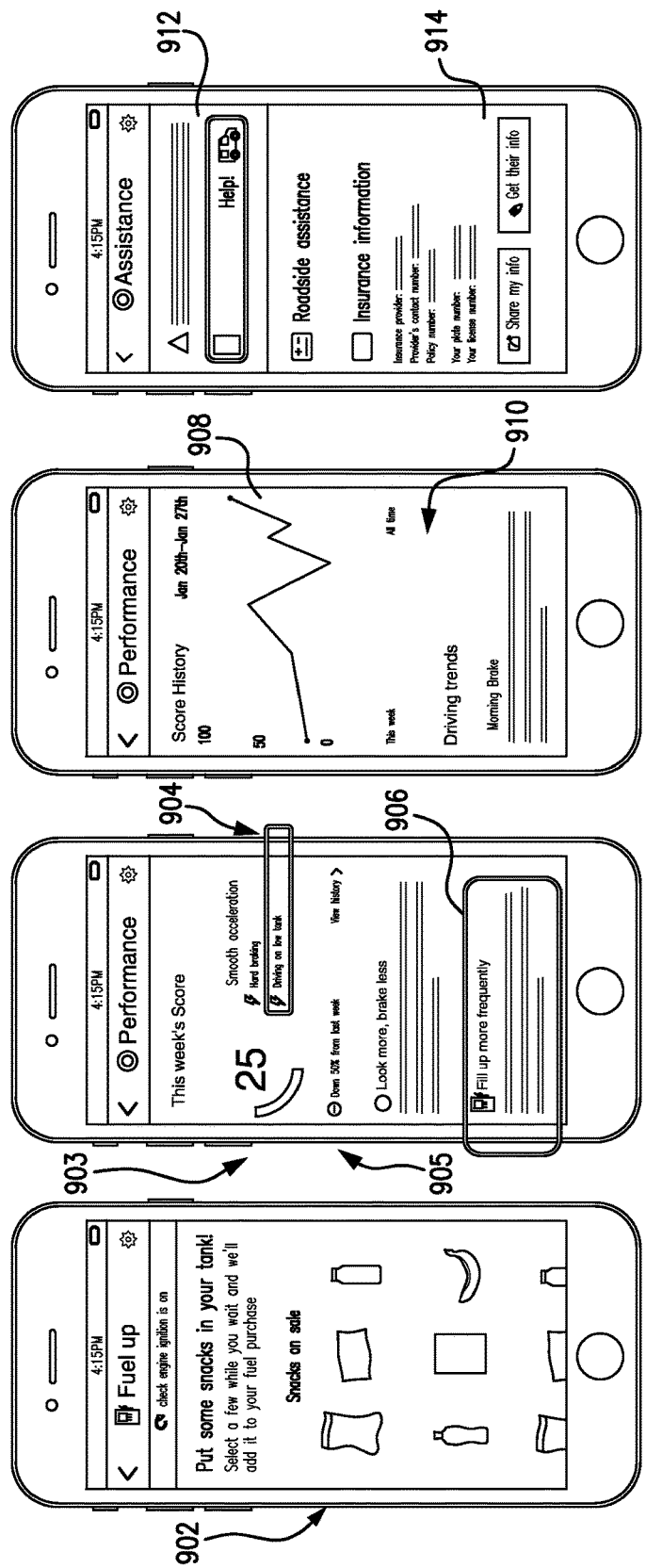

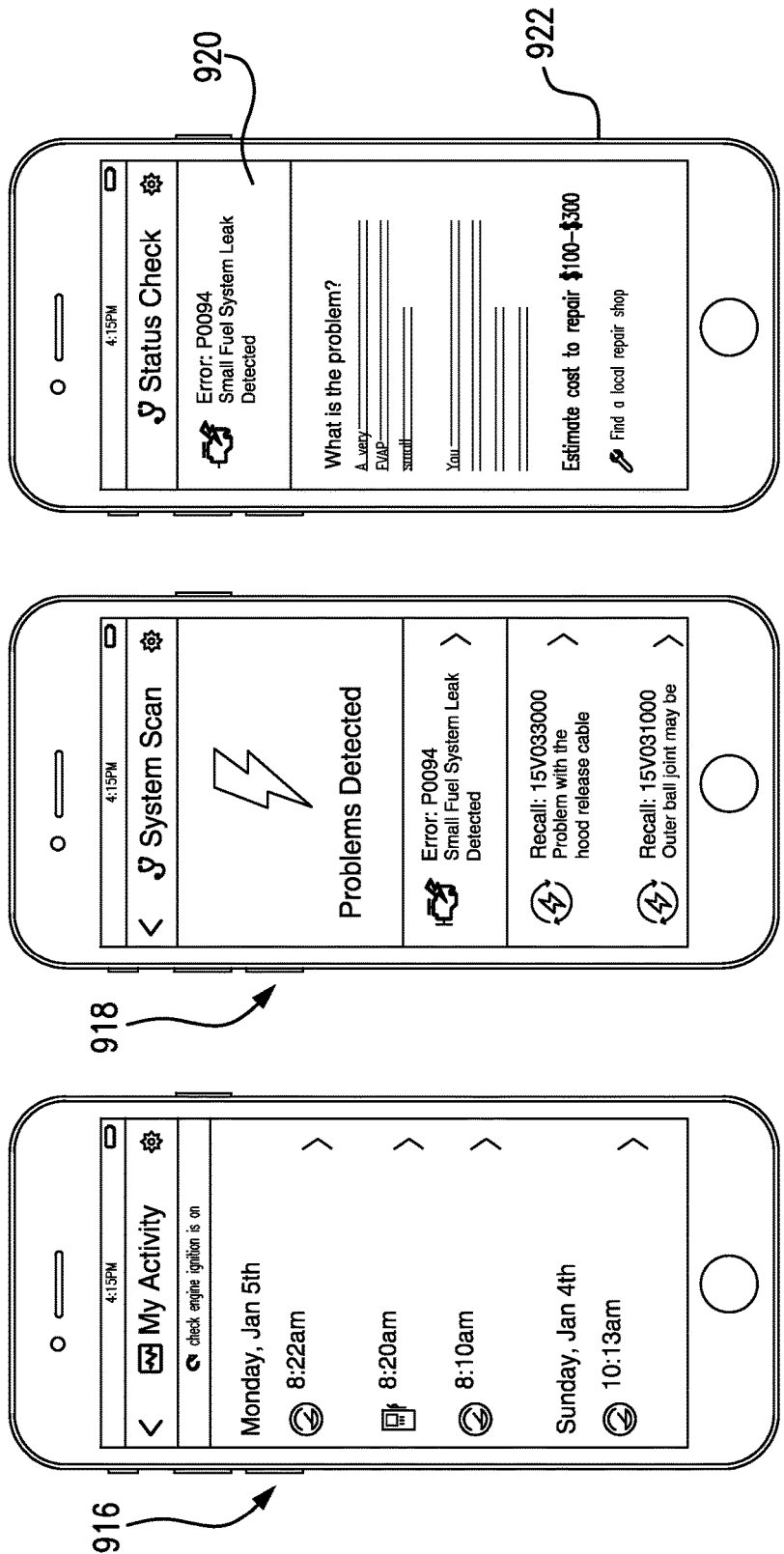

AUTOMATED VEHICLE OWNERSHIP SUPPORT

CROSS REFERENCE TO RELATED APPLICATIONS

This application is a Continuation-in-Part of U.S. application Ser. No. 14/687,557, filed Apr. 15, 2015, U.S. application Ser. No. 14/689,747, filed Apr. 17, 2015 and U.S. application Ser. No. 14/693,176, filed Apr. 22, 2015. The content of the above applications are incorporated by reference in their entirety.

FIELD OF THE INVENTION

This invention relates generally to systems for processing telematics data, and in particular to systems providing automated vehicle ownership support services.

BACKGROUND OF THE INVENTION

Information and interactive mobile services available to mobile vehicles are increasing due to the demand of mobile vehicle operators for services such as navigation assistance, directory assistance, vehicle maintenance assistance, roadside assistance, information services assistance and emergency assistance. Requests for many of these services occur when a vehicle is outside of a home region, for example, during personal travel or business trips to neighboring or distant cities. Presently, on-board diagnostic (OBD) systems are incorporated into many types of vehicles, and provide an electronic solution for controlling, diagnosing, and reporting the operating state of the vehicle and to provide other wireless communication and location-based services.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

However, conventional services do not provide a single interface for an enhanced vehicle ownership experience to the customer.

SUMMARY OF THE INVENTION

As discussed herein, the subject disclosure provides an infrastructure and techniques that represent a marriage of vehicle telematics data, a smart fuel dispenser, cloud-based multichannel commerce solutions, and a customer device (e.g., a mobile device, tablet, computer, etc.). The infrastructure in cooperation with a mobile application running on a customer device provides a customizable vehicle ownership experience to customers, including novel value-added services and advice in addition to conventional capabilities.

According to one particular embodiment of the subject disclosure, a computer system for processing vehicle ownership support data includes an infrastructure platform which includes a plurality of hardware and software components, infrastructure services, Application Program Interfaces (APIs), and Software Development Kits (SDKs) adapted to communicate in a communication network. The system further includes a memory configured to store one or more processes and a processor adapted to execute the processes using the infrastructure platform. The infrastructure platform receives telematics data such as vehicle identification data, driving performance data, vehicle operation data and vehicle sensor data for a corresponding vehicle. Such telematics data can be received from a vehicle device (Onboard Device (OBD)), or from a cloud-based telematics platform. The infrastructure platform identifies vehicle ownership support services associated with the at least one vehicle and analyzes the received telematics data associated with the identified services. The infrastructure platform provides vehicle ownership support services to a mobile application accessible at a customer's mobile device associated with the vehicle. Such services may include, without limitations, automated fuel dispensing, emergency roadside assistance, vehicle maintenance and repair assistance, vehicle performance and driving advice, gamification, monetary rewards and retail discounts, total cost of ownership dashboard and intelligence, and the like.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIGS. 6A-6B illustrate exemplary vehicle related notifications provided by an automated vehicle ownership support services infrastructure via a mobile application in accordance with an embodiment of the present invention;

FIGS. 7A-7F illustrate exemplary enhanced trip management services provided by an automated vehicle ownership support services infrastructure via a mobile application in accordance with an embodiment of the present invention;

FIGS. 9A-9G illustrate additional exemplary services provided by an automated vehicle ownership support services infrastructure via a mobile application in accordance with an embodiment of the present invention.

DESCRIPTION OF EXAMPLE EMBODIMENTS

Reference will now be made to the drawings. A component or a feature that is common to more than one drawing is indicated with the same reference number in each of the drawings.

Figure 1:
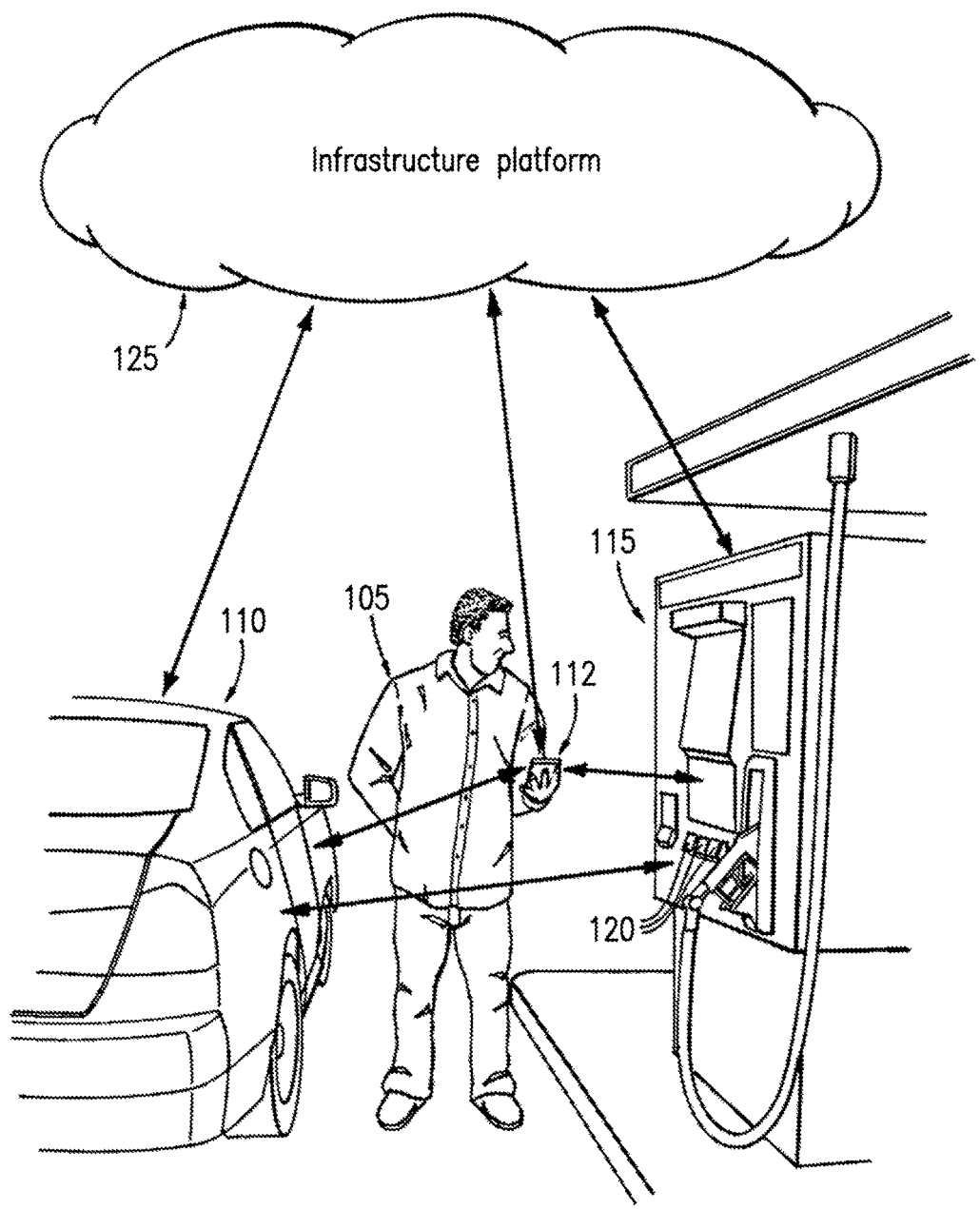
FIG. 1 illustrates a schematic diagram view of an exemplary vehicle ownership support service in the form of an enhanced fuel dispensing system constructed in accordance with embodiments of the present invention.

As noted above, the infrastructure platform disclosed herein provides vehicle ownership support services to a mobile application accessible at a customer's mobile device associated with a customer's vehicle. Such services may include automated fuel dispensing services among many others. Conventional fuel dispensers permit customers to dispense fuel into customer vehicles. FIG. 1 illustrates a schematic diagram view of a smart or enhanced fuel dispensing system constructed in accordance with embodiments of the present disclosure. As shown, various devices communicate with each other, with customer 105, and/or with an infrastructure platform 125, discussed in greater detail below.

Smart fueling techniques, which are provided by dispensing system 115 create an environment that supports communication amongst the vehicle 110, a customer device 112 (e.g., a mobile phone, tablet, computing device, wearable device, etc.), and a smart fuel dispenser 115. Notably, various communications options exist amongst each of these devices. For example, each of the vehicle 110, the customer device 112, and fuel dispenser 115 can communicate directly with each other and/or can communicate through infrastructure platform 125.

Although fuel dispenser 115 is shown as a physical standalone fueling station with physical user interfaces such as buttons 120, it is expressly contemplated that fuel dispenser 115 can be part of and communicate with a larger distributed processing system (e.g., the cloud-based processing system).

As discussed herein, vehicle 110 includes vehicle telematics data either directly obtained from the vehicle telematics data infrastructure including any server/cloud stored data or via one or more onboard diagnostic (OBD) systems that generate telematics data, including vehicle diagnostic data. With respect to telematics data, generally telematics represents a mix of hardware and software telecommunications technology that conveys data or information for the purpose of improving business services or functions. In the automotive space, telematics has evolved to also include vehicle diagnostic data, global positioning satellite (GPS) data corresponding to the vehicle, support services data and the like.

Figure 2:
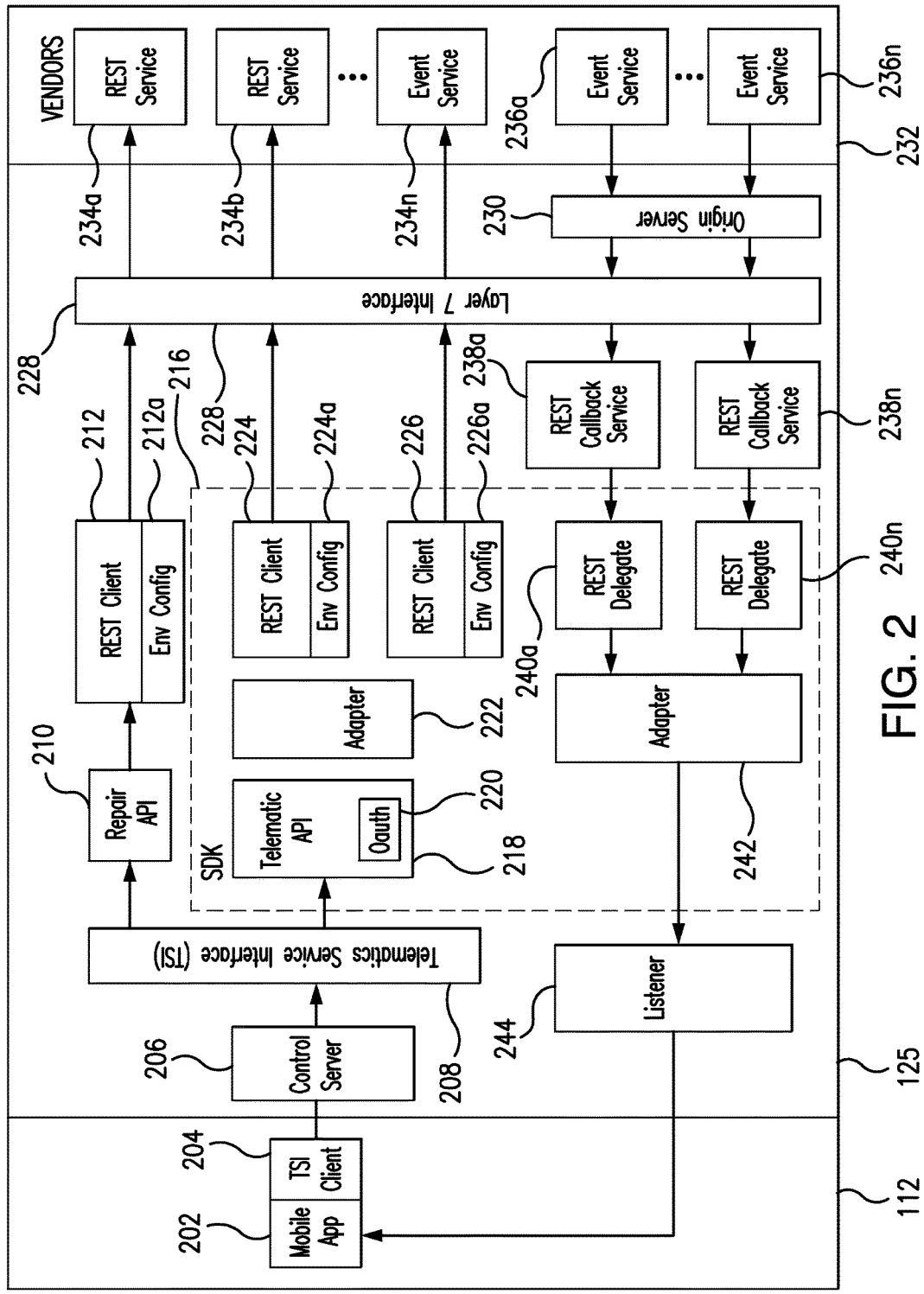
FIG. 2 shows an exemplary architecture diagram for a system for processing vehicle ownership support data in accordance with an embodiment of the present invention.

FIG. 2 shows an exemplary architecture diagram for a system for processing vehicle ownership support data in accordance with an embodiment of the present invention. In one illustrative embodiment, the disclosed system may include an automated vehicle ownership support services infrastructure 125 that may comprise a content delivery network (CDN). As illustrated, the CDN may include an origin server 230, a distribution server (also "control server") 206, and various hardware and software components, infrastructure services, APIs, and SDKs adapted to communicate in a CDN. For example, a distribution server 206 may be designated to provide enhanced vehicle ownership support services by serving content objects to end users mobile devices 112 in a particular city, on a particular access network, or both, to facilitate efficient delivery and promote a good user experience. As used herein, a content object is any content file or content stream and could include, for example, video, pictures, maps, data, audio, software, and/or text.

An end user requests delivery of enhanced vehicle ownership support services through its respective end user device 112. The end user device 112 could be a handheld computer, media player, mobile Internet appliance, smartphone, streaming radio or any other mobile device that can be associated with end user's vehicle 110 and capable of receiving and processing content objects.

According to an embodiment of the present invention, the control server 206 balances the need to provide rapid delivery of content objects (i.e., alerts) to end user devices 112 with the need to make efficient use of network resources. In one non-limiting embodiment, the control server 206 can monitor the state of content objects at origin server 230 and detect when a content provider uploads or publishes new or modified content objects (e.g., telematics events). In various embodiments, messaging system employed by the infrastructure platform, for example, can be middleware based on the Advanced Message Queuing Protocol (AMQP). In various embodiments, the messaging system can be a publish-and-subscribe, request-response, or some other linkage by which the control server 206 monitors, detects, and/or is alerted to enhanced vehicle ownership related events at the origin server 230. In example embodiments, the infrastructure platform 125 may include one or more layers between the control server 206 and the origin server 230. Each layer may provide a different API. Advantageously, the infrastructure platform 125 allows one of skill in the art to adapt the operational/functional description of the technology across many different vendors' hardware configurations or platforms, without being limited to specific vendors' hardware configurations or platforms.

As illustrated in FIG. 2, the system for processing vehicle ownership support data of the present disclosure includes a Telematics Service Interface (TSI) 208 adapted to actively create an interface and a communication link between a TSI client 204 hosted by the mobile device 112 and one of the APIs 210, 218. Further, the TSI 208 allows the infrastructure platform 125 to provide various vehicle related services, for example, a telematics service such as a remote diagnosis or e-Call while acting as a relay between the infrastructure platform 125 and an external device hosting a mobile application 202.

As noted above, the infrastructure platform 125 may include an SDK (Service Development Kit) 216 having an API modules, such as telematic API 218, repair API 210, allowing mobile applications 202 to connect to at least one web services module contained within layer 7 interface 228. In one embodiment, the TSI client 204 may communicate with the layer 7 interface 228 through remote procedure calls. In one embodiment, the infrastructure platform 125 deploys Java technology. It should be appreciated that Java technology's platform-independence and superior security model provide a cross-platform solution for the heterogeneous systems. Thus, in one embodiment, telematic API 218 may include Java APIs that are available to support telematics mediums, such as speech recognition through Java Speech API (JSAPI), media delivery through Java Media Framework (JMF) and wireless telephony through Wireless Telephony Communications APIs (WTCA), etc.

In one embodiment, a plurality of vehicle support services may comprise a cloud-based platform 232 storing service consumer's information as well as collected vehicle related data (i.e., telematics data and sensor data). The telematic API 218 may include an Oauth API 220. OAuth is a protocol that allows applications developed by third-parties to access a service consumer's account. Within the OAuth workflow, the consumer/user is redirected from the mobile application 202 to an authentication endpoint for the cloud service, where the user provides authentication credentials and authorizes access by the mobile application 202. This process enables the third party application (i.e., mobile application 202) to access the vendor provided service (i.e., web service) without requiring the user to share their authentication credentials with the mobile application 202.

In an exemplary embodiment illustrated in FIG. 2, the SDK 216 may use Representational State Transfer (REST)-style service calls (e.g., REST service clients). REST is a predominant web service design model for distributed systems. REST uses the HTTP protocol directly for communication. REST does not require the complex code to communicate through SOAP or use XML for data interchange. A plurality of vendor specific REST clients 212, 224, 226 may send REST service calls to a plurality of cloud-based vendor-specific services 234a-n, 236a-n via the layer 7 interface 228 using the HTTP protocol and may send data in JavaScript Object Notation (JSON) format, for example. In addition each REST client 212, 224, 226 may include corresponding configuration data 212a, 224a, 226a for accessing metadata and definitions associated with at least one cloud-based vehicle ownership support REST service 234, 236 provided by one or more REST service providers.

In addition, the SDK 216 may include one or more adapter containers, such as a first adapter container 222 and a second adapter container 242 and one or more delegate interfaces 240a-240n. The protocol adapter containers 222 and 242 can manage the lifecycle of each of the protocol adapters. The protocol adapters may include a REST protocol adapter which provides the REST protocol support by deploying REST enabled bundles, for example. Adapters can be constructed that define services and events. In one embodiment, REST protocol adapters may include event definitions and related event factories.

According to an embodiment of the present invention, the SDK 216 is designed as a pluggable component that can be placed into any environment to provide the telematics data. The REST delegate interfaces 240a-240n provide the ability to plug any REST implementations available in the industry (such as Java reference Jersey, JBOSS RestEasy, etc.) to a standardized telematics callback interface to support telematics events.

In accordance with an embodiment of the present invention, the infrastructure platform 125 may include one or more event detecting and reporting mechanisms. In some embodiments, such event reporting mechanism may include a plurality of callback service interfaces enabled to communicate with corresponding callback agents (not shown in FIG. 2). The callback agents may be software modules configured to track particular telematics attributes and report back to a corresponding call back service interface 238a, 238n. It is noted callbacks may be triggered when a specific telematics event associated with a particular vehicle ownership support service is detected, for example. In the illustrated embodiment such events may be published by specific cloud-based REST services 236a-236n. In some embodiments, callbacks may be immediately called when a particular telematic event occurs. In other embodiments, callbacks may be queued and reported periodically to event listener 244. Various embodiments of the present invention contemplate other event detecting and reporting mechanisms (e.g., asynchronous service invocations other than callbacks or polling). The event listener 244 is an infrastructure platform 125 element that detects ("listens" for) an occurrence of an event of a specified type or types collected by the infrastructure platform 125 and notifies a subscriber (i.e., mobile application 202) of the occurrence of the event.

Figure 3:
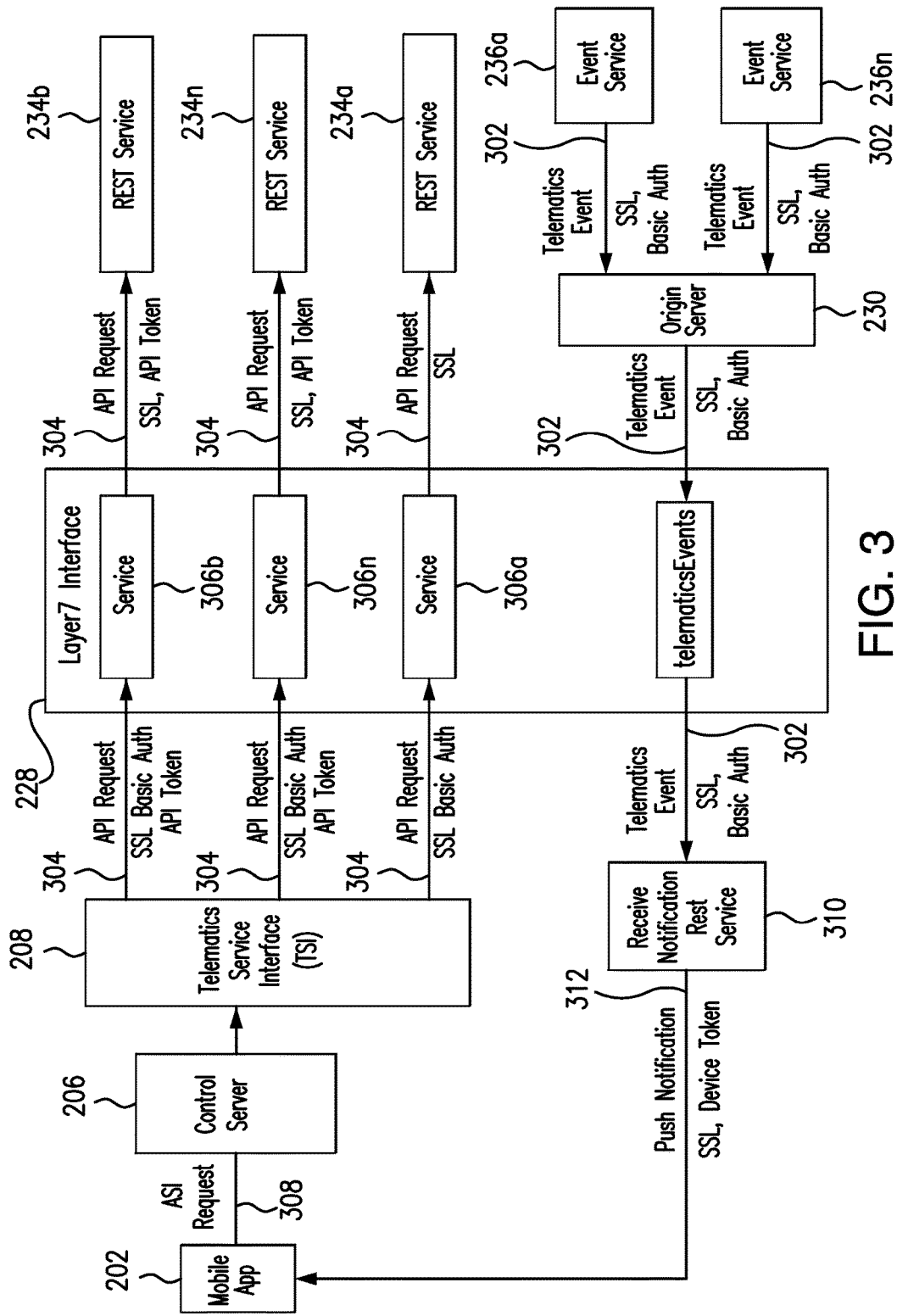
FIG. 3 is a more detailed architecture diagram showing communications amongst system components shown in FIG. 2 in accordance with an embodiment of the present invention.

FIG. 3 is a more detailed architecture diagram showing communications amongst system components shown in FIG. 2 in accordance with an embodiment of the present invention. In a preferred embodiment, mobile devices hosting the mobile application 202 (i.e., a smartphone) preferably uses asynchronous data transfer techniques in a multi-threaded computing environment to communicate with the infrastructure platform 125 to prevent thread-blocking that gives the appearance of the mobile application 202 seizing up while waiting for a particular request to be completed. Certain preferred embodiments may use ASI HTTP Requests 308, for example on Apple iOS smartphones, to request a particular service and/or transaction with the control server 206 without blocking a major program thread. Furthermore, as shown in FIG. 3, in one illustrative embodiment, the infrastructure platform 125 may employ a plurality of API requests 304 (i.e. Oauth API requests) for inter-layer communication and for communication with cloud-based vehicle ownership support REST services 234, 236. In a preferred embodiment each API request 304 contains at least some of the following information: a communication use protocol (e.g., SSL), a request token, uniform resource locator, which may be used for identifying the service address provided by the vehicle ownership support service provider, an authorization and authentication URL, an access token URL, a mobile application identifying information, an application signature, and the like.

As shown in FIG. 3, in an embodiment of the present invention, the layer 7 web-service interface 228 comprises a message passing interface. In other words, the layer 7 interface 228 may be configured to receive the API Requests 304 from the TSI 208, perform authentication and pass the received requests 304 to one of the plurality of cloud-based vendor-specific services 234a-n. Furthermore, as noted above, the provider specific event services 236a-236n may publish a plurality of telematics events 302 to the origin server 230. In turn, the origin server 230 may communicate information related to specific telematics events related to a particular vehicle to a dedicated web service included in the layer 7 interface 228.

In exemplary embodiments, the infrastructure platform 125 also includes a RESTful notification service 310, which is an example of push notification middleware. In various embodiments, the notification service 310 may support multiple notification transport protocols. For example and without limitation, the RESTful notification service 310 may receive asynchronous telematics events 302 from the layer 7 interface 228 and may support the following notification transport protocols: Google™ Cloud Messaging (GCM), Apple™ Push Notification Service (APNs), and Short Message Service (SMS). Each of the transport protocols can be used to establish channels for telematics event push notifications 312 to the mobile application 202. In some cases, the infrastructure platform 125 may further include various gateways (not shown in FIG. 3) that may be used to establish notification channels with the mobile application 202. For example, such gateways may include a GCM gateway, an SMS server, and a APNs gateway. It will be understood that additional or fewer push notification components can be supported in various embodiments of the infrastructure platform 125. An example of a telematics event notification channel is depicted in FIG. 3 that is established by the notification service 310 associated with a particular notification transport protocol (e.g., APN) to send a telematics event 302 trigger with a payload between the layer 7 interface 228, notification service 310, and the mobile application 202 in this example.

Figure 4:
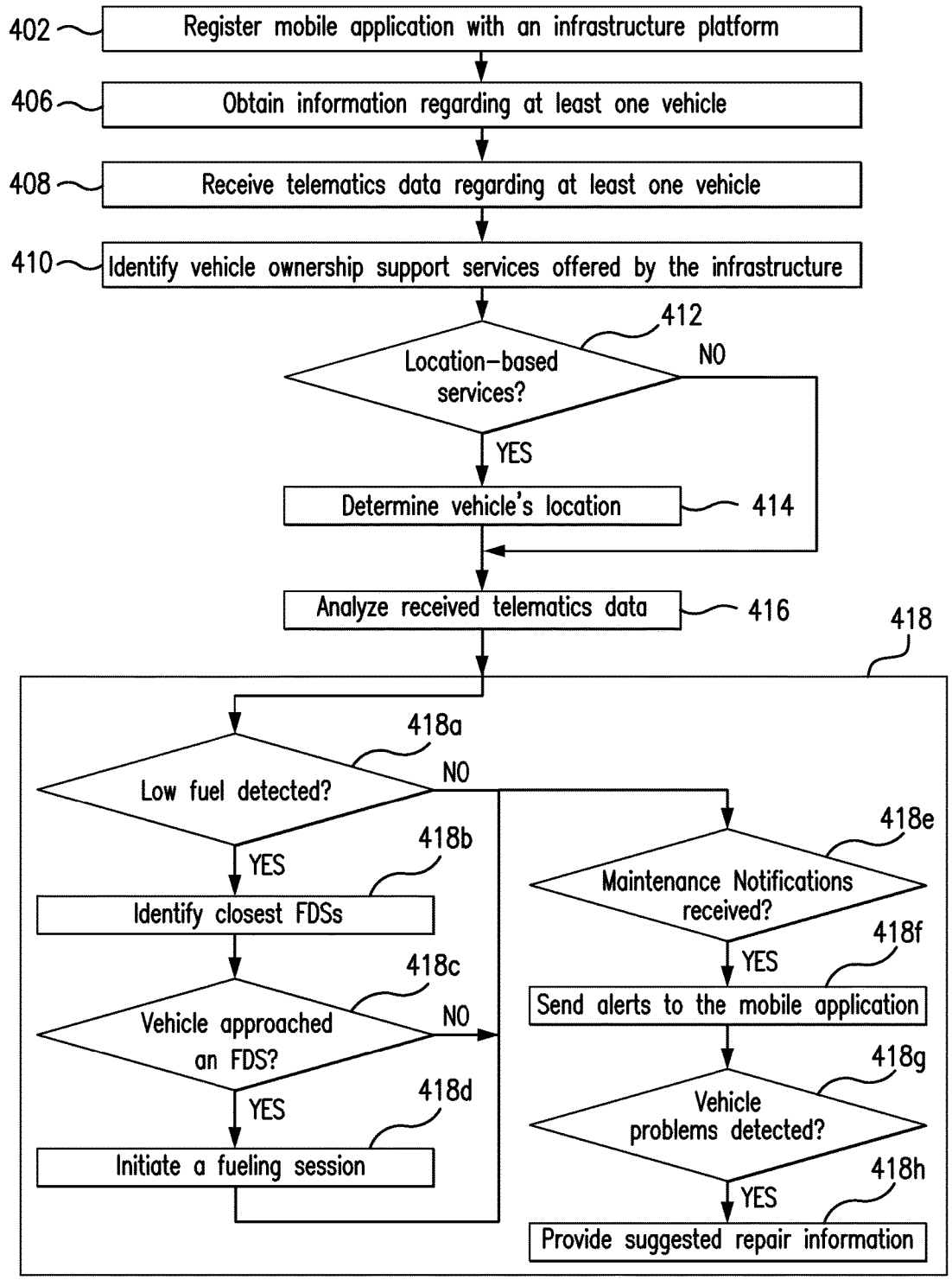
FIG. 4 is a process flow diagram for the system of FIGS. 2 and 3 demonstrating some exemplary vehicle ownership support services provided by the system in accordance with an embodiment of the present invention.

FIG. 4 is a process flow diagram for the system of FIGS. 2 and 3 demonstrating some exemplary vehicle ownership support services provided by the system in accordance with an embodiment of the present invention. Before turning to description of FIG. 4, it is noted that the flow diagram in FIG. 4 shows examples in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more steps may be omitted. In some embodiments, one or more additional steps may be performed. As will be appreciated by one skilled in the art, aspects of the present invention may be embodied as a method or computer program product. In some embodiments, the method described below may be performed, at least in part, by one or more components of a computer system for processing vehicle ownership support data.

Figure 5E:
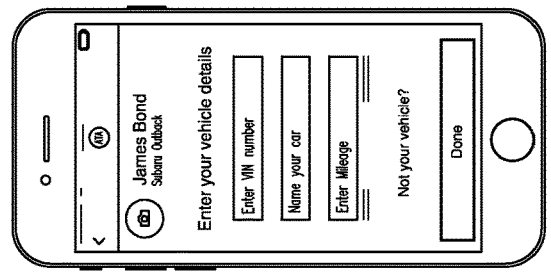
FIGS. 5A-5E illustrate an exemplary onboarding process for accessing automated vehicle ownership support services infrastructure in accordance with an embodiment of the present invention.
Figure 5D:
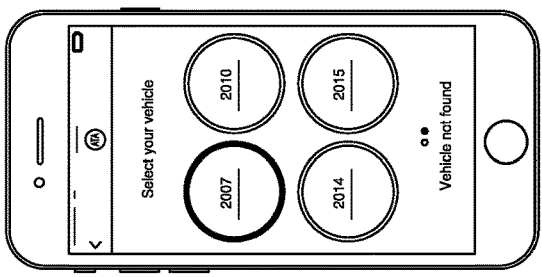
Figure 5C:
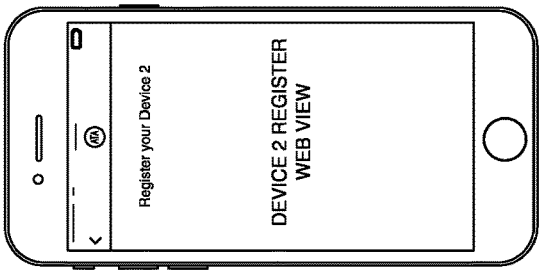
Figure 5B:
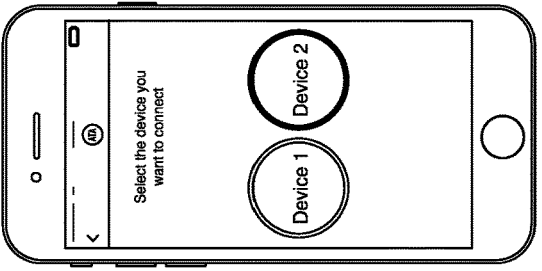
Figure 5A:
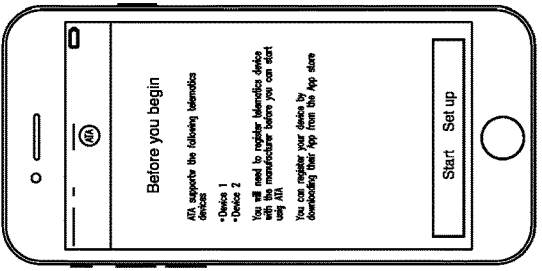

The computer system for processing vehicle ownership support data described herein provides a mechanism for a user to download a mobile application 202 using a common ecosystem such as, for example, those provided by Apple™ and Google™. According to an embodiment of the present invention, at step 402, a user registers the mobile application with the infrastructure platform 125 described above. FIGS. SA-5E illustrate an exemplary registration process for accessing automated vehicle ownership support services infrastructure in accordance with an embodiment of the present invention. As shown in FIG. 5B as part of that registration process the user may select one or more vehicle telematics devices which can be physically installed in a user's vehicle by connecting the vehicle telematics device to a vehicle communication interface of the vehicle. As described herein such vehicle telematics devices monitor information regarding operation of the vehicle, for example. The vehicle communication interface includes, but is not limited to, an on-board diagnostics (OBD) port, OBD-II port, controller area network (CAN) port, and the like. In various embodiments, vehicle telematics devices may be offered by the providers of cloud-based services 234a-n. As shown in FIG. 5D, having selected a vehicle telematics device, a user can choose one or more vehicles to be associated with at least one cloud-based vehicle ownership support REST service 234, 236 provided by one or more REST service providers using the infrastructure platform 125. Referring back to FIG. 4, at step 406, as part of the registration process, the infrastructure platform 125 may receive additional information (i.e., a VIN number, mileage, etc.) about one or more vehicles to be registered with the REST service providers. In some embodiments this information may be obtained automatically as part of telematics data, while in other embodiments such data may be entered by users.

Once the registration process is complete, at step 408, the infrastructure platform 125 (i.e., one or more components of infrastructure platform 125) starts receiving telematics data (e.g., telematics events, etc.) regarding at least one vehicle. Such telematics data can be derived from a registered vehicle telematics device and provided by one of the cloud-based vehicle ownership support services 234a-n and the like.

Next, at step 410, the infrastructure platform 125 identifies one or more vehicle ownership support services subscribed to by the mobile application 202. It is noted that as part of the registration process, the infrastructure platform 125 (e.g., control server 206) initiates download of the mobile application 202 to the mobile device 112. The infrastructure platform 125 also initiates subscription to any vehicle ownership support service selected by a user as part of the registration process (at step 402) when prompted. According to an embodiment of the present invention, the infrastructure platform 125 may also automatically determine whether any of the subscribed to vehicle ownership support services include location-based services (at step 412).

In response to determining that the mobile application 202 has subscribed to one or more location-based services (decision block 412, yes branch), at step 414, the infrastructure platform 125 determines a location of the vehicle based on at least one of the telematics data and a location of the mobile device 112 associated with the vehicle (e.g., GPS data, NFC data, Bluetooth® data, etc.). As described above, the infrastructure platform 125 in various embodiments provides the functionality by which data received from the vehicle telematics device via one or more third party vehicle ownership support services 234a-n is collected and organized. Such data includes but is not limited to data regarding a user or a vehicle. Examples include: information about user's movements, such as where a user has traveled and the route that the user has taken to reach a destination; information regarding the manner in which a user traveled to a destination, such as the speed of the vehicle, braking force, the time of day; information regarding the conditions of such movement, such as the weather or traffic conditions, information about whether and how often other technology was used during the trip, such as mobile phone, computer or navigation system; information regarding the vehicle's stay at a destination, such as how long the vehicle stayed at a destination or whether there were other vehicles present; information regarding the nature of the destinations, such as whether the destination is a home or business, and the type of home or business (e.g. fuel dispensing station, gym, restaurant, car dealer, etc.); and information about the condition of the vehicle itself, such as vehicle diagnostic information, etc.

According to an embodiment of the present invention, the infrastructure platform 125 may include and/or may be communicatively coupled to an analysis engine (not shown in FIGS. 2, 3). In one embodiment, the analysis engine comprises the functionality by which the infrastructure platform 125 analyzes telematics and/or location data and extracts meaning from such data (step 416). Such meaning may be extracted in different ways depending on a particular vehicle ownership support service.

In one instance, such analysis engine may try to identify a pattern of behavior from telematics data and extract meaning from it. A pattern of behavior may be engaging in a certain type of behavior with at a certain level of frequency. For example, driving to the same address every day may indicate that a user lives or works at the address. In another example, the analysis engine may evaluate patterns of behavior based on multiple variables. For instance, driving to the same address each day during business hours may have a different meaning than driving to the same address outside of business hours.

According to an embodiment of the present invention, at step 418, one or more vehicle ownership support services may be provided to the mobile application 202 via the infrastructure platform 125. Note that the sequence and the specific steps discussed below are provided for illustrative purposes only. The specific steps required and order of the steps may vary in accordance with the vehicle ownership support services selected. In some cases steps may be omitted, steps may be added; or the sequence of steps may be rearranged.

FIGS. 6A-6B illustrate exemplary vehicle related notifications provided by an automated vehicle ownership support services infrastructure via a mobile application in accordance with an embodiment of the present invention. For example, FIG. 6A shows an example of a dashboard notification view. A dashboard notification view may display together the following information: vehicle identification information 602, user configurable alerts information 604, information related to fuel consumption 606 and trip performance information 608. The vehicle identification information 602 may include the vehicle's manufacturer, make, model, year, etc. In one embodiment, the mobile application 202 may include configurable programmatic settings for the low fuel alert and warning levels related to vehicle's maintenance issues that are delivered to the mobile application 202 in response to receiving asynchronous telematics events 302 published by the provider specific event services 236a-236n to the origin server 230, as described above. Typically, the vehicle's OBD provides a low level fluid warning indicator which provides a warning as to the low level of fuel remaining in the fuel tank based on a predetermined threshold. In contrast, the low level notification may be displayed by the infrastructure platform 125 based on the user configurable parameters. The fuel consumption related information 606 may include a remaining amount of fuel or a driving range such as the distance remaining to empty.

Referring back to FIG. 4, in one embodiment, at step 418a, the infrastructure platform 125 may be configured to automatically detect low fuel conditions by monitoring generated push notifications 312. In response to detecting a low fuel alert (decision block 418a, yes branch) the infrastructure platform 125 may automatically identify at least one closest fuel dispensing station based on the current location of the vehicle (at 418b) and based on the third party information provided by the cloud-based vehicle ownership support services 234a-n. Furthermore, the infrastructure platform 125 may automatically send map information corresponding to the identified fuel dispensing stations to the mobile application 202. In one embodiment a user of the mobile application 202 may invoke such fueling station finder map 610 functionality by touching a low fuel alert 604, for example. In one embodiment, at step 418c, the infrastructure platform 125 may continue to monitor vehicle's location with respect to the identified fuel dispensing stations. If the infrastructure platform 125 determines that the monitored vehicle is located in a predetermined proximity of one of the identified fuel dispensing stations (decision block 418c, yes branch), the infrastructure platform 125 may automatically determine scope of fueling permissions associated with the received vehicle identification data and initiate a fueling session (at 418d) associated with the vehicle 110, as shown in FIG. 1.

Figure 7C:
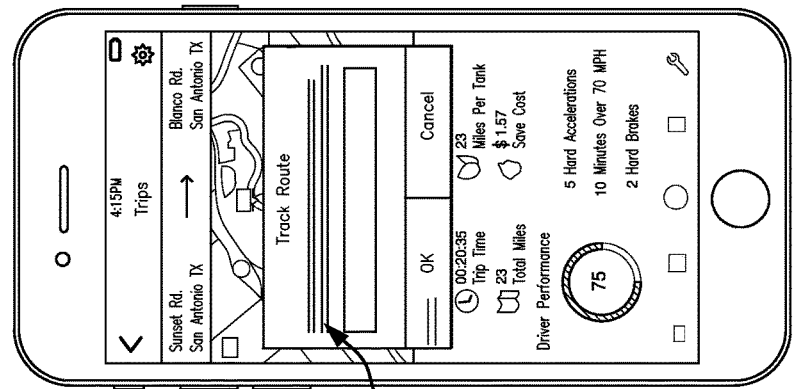
Figure 7B:
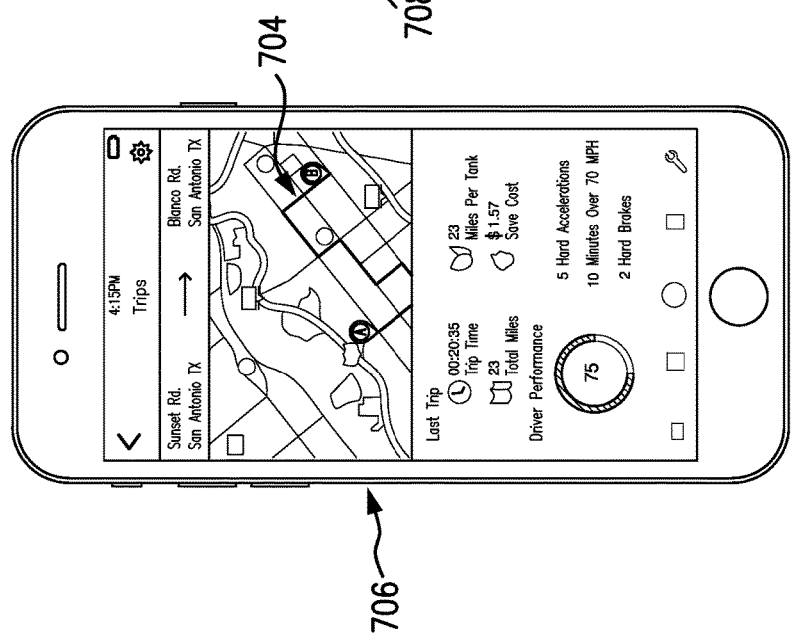
Figure 7A:
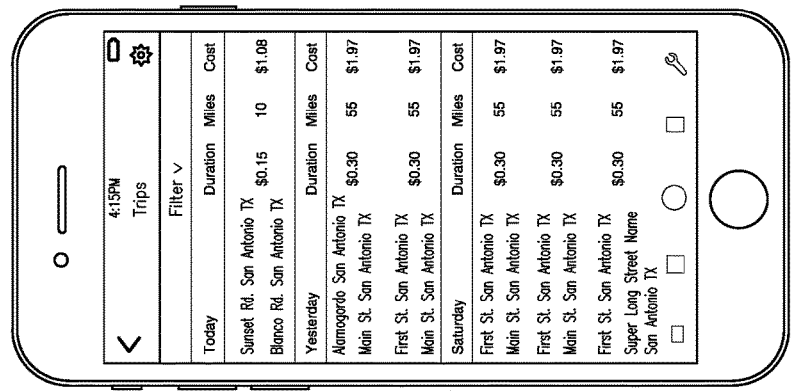

FIGS. 7A-7F illustrate exemplary enhanced trip management services provided by an automated vehicle ownership support services infrastructure via a mobile application in accordance with an embodiment of the present invention. In one embodiment, trip information 702 may be provided to a user based on predefined travel criteria (e.g., cost, emissions, mileage, duration, travel quality etc.) with respect to routes previously travelled by the user's vehicle. As shown in FIGS. 7B-7E, users of mobile application 202 may have an ability to designate one or more routes listed in the trip information 702 as frequently travelled routes. FIG. 7B illustrates that a user may have an ability to select a frequently travelled route 704 using the corresponding map 706 displayed by the mobile application 202. FIG. 7C illustrates that the mobile application 202 may prompt 708 the user to provide a name or any other identifier for the selected route 704. For example, the user may designate the selected route 704 as a morning commute route 710, as shown in FIG. 7D. It is noted that infrastructure platform 125 may store the user provided name along with other information (i.e., map information) associated with the selected route 712 (as shown in FIG. 7E). Advantageously, the analysis engine may analyze the obtained telematics data for the one or more routes designated as frequently travelled by the user. For example, the enhanced trip management service may provide optimal travel time(s), optimal alternative route(s), etc. with respect to the frequently traveled routes. In one embodiment, by continuing to monitor and update the information received (including telematics information and statistical information), the infrastructure platform 125 can automatically update a predicted travel time and/or change routes (or a portion of a route) to provide the user with the best information so that the shortest route is taken, even in view of the dynamic nature of changing road conditions. FIG. 7F illustrates additional functionality related to trip information that may be provided by mobile application 202. More specifically, the users may have the ability to filter 714 the information related to the previously designated frequently travelled routes.

Referring back to FIG. 4 yet again, in one embodiment the mobile application 202 may be subscribed to receiving maintenance notifications. Accordingly, in the illustrated embodiment, at step 418e, the infrastructure platform 125 may be configured to automatically detect any telematics events related to the monitored vehicle's maintenance. In response to determining that at least one of the published telematics events is related to the vehicle's maintenance (decision block 418e, yes branch), at step 418f, the infrastructure platform 125 preferably generates and sends a corresponding alert to the mobile application 202 using one of the establish notification channels with the mobile application 202, as described above in conjunction with FIG. 3.

Figure 8C:
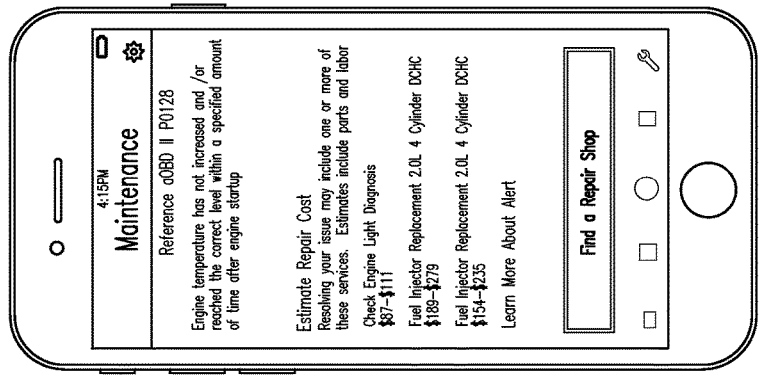
FIGS. 8A-8C illustrate exemplary enhanced vehicle maintenance support services provided by an automated vehicle ownership support services infrastructure via a mobile application in accordance with an embodiment of the present invention.
Figure 8B:
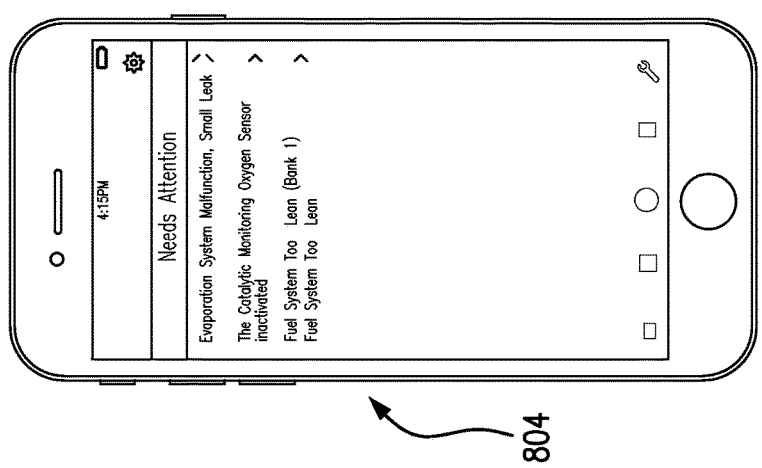
Figure 8A:
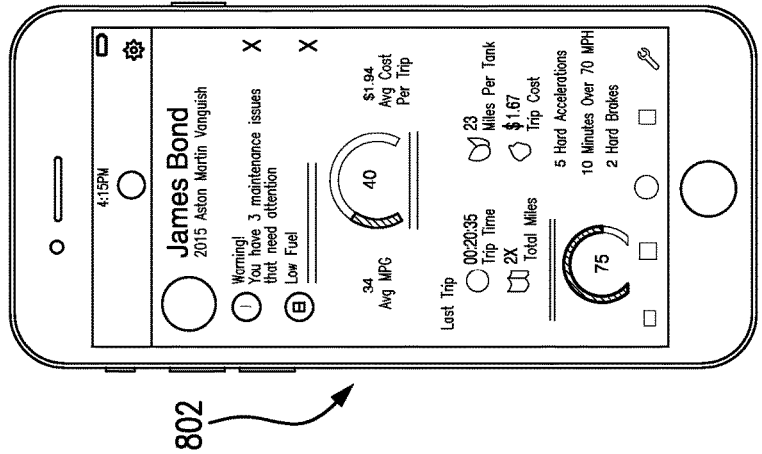

FIGS. 8A-8C illustrate exemplary enhanced vehicle maintenance support services provided by an automated vehicle ownership support services infrastructure via a mobile application in accordance with an embodiment of the present invention. Once the mobile application 202 receives maintenance related alerts sent by the infrastructure platform 125 (at step 418f), the mobile application 202 may display the received alerts associated with maintenance related issues 802 to a user along with other user configurable alerts information (i.e., low fuel alerts), as shown in FIG. 8A. In one embodiment of the present invention, a user may be able to obtain more detailed information for each identified issue, for example, by touching the received maintenance alert. As noted above, for illustrative purposes only, telematics data obtained and maintained by the infrastructure platform 125 includes vehicle diagnostic data. Those skilled in the art will understand that diagnostic data available from the vehicle's engine control unit (ECU) usually includes generated 5-digit 'diagnostic trouble codes' (DTCs) that indicate a specific problem with the vehicle. Advantageously, according to an embodiment of the present invention, for each identified maintenance issue, the infrastructure platform 125 decodes the received DTC data by applying it against a lookup table that may be provided by a third party. In the illustrated embodiment, as shown in FIG. 8B, the detailed information related to the identified maintenance issues 804 may include description of the identified maintenance issue, as well as information identifying faulty parts.

In a preferred embodiment, one of the enhanced vehicle maintenance support services may include automated repair assistance. Referring back to FIG. 4, at step 418g, the analysis engine or any other suitable component of the infrastructure platform 125 may examine the received diagnostics data to determine whether any of the identified issues are serious enough to require immediate repairs. If such issues are found (decision block 418g, yes branch), at step 418h the infrastructure platform 125 preferably provides suggested repair information including, for example, estimated costs 806 as shown in FIG. 8C. In this illustrative embodiment, at least one cloud-based vehicle ownership support REST service 234, 236 may provide relevant information related to a plurality of vehicle repair service providers. The relevant service provider information may include the name of the service provider, a description, an address, a phone number, a mobile phone number, a fax number, an e-mail address, technician names, and any other relevant information such as, but not limited to certification information. The certification information may include a qualification type, a certificate number, an expiration date for the certificate, a status, and any other relevant information associated with technicians, for example. In one embodiment, the mobile application 202 may employ map functionality similar to fueling station finder map 610 shown in FIG. 6B to display information related to the relevant service providers located in the vicinity of vehicle's current location, for instance. The estimated repair information may be derived based on the information exchanged between the infrastructure platform 125 and corresponding vendor specific cloud-based vehicle ownership support REST service 234.

FIGS. 9A-9G illustrate additional exemplary services provided by an automated vehicle ownership support services infrastructure via a mobile application in accordance with an embodiment of the present invention. It should be noted that while a fuel dispensing facility is shown in FIG. 1 and described above, embodiments of the present invention contemplate the situation where an entire chain of stores or related stores may be interconnected such that any one of their POS terminals can be connected to a single server through the infrastructure platform 125. Further, as described above, numerous fuel dispensing stations can also be coupled to the infrastructure platform 125 to allow discounted fuel in response to customer purchases at one of the associated retail stores, for example. Also, fuel companies can form alliances such that Chevron and Exxon can have their pump controllers connected to the same cloud-based vehicle ownership support REST service 234. Further, it can be seen that with the infrastructure platform 125 described above it is possible to connect virtually any retailer wishing to offer discounted fuel based on predefined purchase criteria with virtually any fuel station without geographic boundary by employing the cloud-based REST service 234. It is noted that discounts may also be offered for purchase of items other than fuel, such as discounts 902 at a convenience store or other retailer associated with a fuel dispensing station (shown in FIG. 9A) which may be offered to a user during a fueling session via the mobile application 202.

According to an embodiment of the present invention, the infrastructure platform 125 may include performance monitoring service based on telematics data provided by one or more cloud-based REST services 234. For example, such monitoring services may assess the operation of a vehicle, user's driving behavior and the potential for vehicle accidents. It is often beneficial to provide users ongoing information about their driving performance and how that driving performance compares to the performance of the user's peers. FIG. 9B illustrate an exemplary performance assessment service that may be provided by the infrastructure platform 125 and that may be rendered via mobile application 202. In one non-limiting embodiment, such performance assessment may include users's driving performance score 903, driving behavior 904 and advice 906. This advice 906 gives the user sufficient information to manage his or her driving behaviors in a proactive manner and understand his or her performance relative to long term car care. It gives the driver an opportunity to make improvements and see the results of those improvements in terms of vehicle maintenance and repair costs. Providing the information in a historical format 905 allows users to track their improvements over time. The overall driving performance score 903 shown in FIG. 9B summarizes the user's overall performance for the time period in the form of a single performance score. By implementing a historical driver score analysis the disclosed performance monitoring service provides this information directly to users in a concise and summarized graphical format 908. Advantageously, many users may be encouraged or motivated to make improvements and will have the information (such as driving trends 910 shown in FIG. 9C) to track their progress.

FIG. 9D illustrates an exemplary roadside assistance service that may be provided by an automated vehicle ownership support services infrastructure via a mobile application 202 in accordance with an embodiment of the present invention. More specifically, for example, the infrastructure platform 125 may automatically assess damage to the vehicle and/or health of vehicle occupants in the event of an accident or incident. Further, the infrastructure platform 125 may also determine number of people involved, vital signs, images from within the vehicle (e.g., via cameras), black box type telematics data (e.g., speed at impact, time of day, time/length of impact, etc.). Additionally, the mobile application 202 may enable users to communicate data to EMS, police, insurance company, mobile phones and/or other linked devices via the infrastructure platform 125 (e.g. in the form of push notifications 312). Automatic crash reporting for police 912 and insurance information 914 may also be provided.

FIGS. 9E-9G illustrate exemplary user activity log and enhanced vehicle maintenance services that may be provided by an automated vehicle ownership support services infrastructure via a mobile application 202 in accordance with an embodiment of the present invention. More specifically, FIG. 9E illustrates additional enhanced capability of logging user's driving activity and vehicle operating data 916. As noted above, once the mobile application 202 receives maintenance related alerts sent by the infrastructure platform 125 (at step 418f), the mobile application 202 may display the received alerts associated with maintenance related issues 918 to a user along with other user configurable alerts information, as shown in FIG. 9F. In one embodiment of the present invention, a user may be able to obtain more detailed information 922 for each identified issue, for example, by touching the received maintenance alert. Advantageously, according to an embodiment of the present invention, for each identified maintenance issue, the infrastructure platform 125 decodes the received DTC data by applying it against a lookup table that may be provided by a third party. In the illustrated embodiment, as shown in FIG. 9G, the detailed information 922 related to the identified maintenance issue 920 may include description of the identified maintenance issue, as well as information identifying faulty parts and a practical advice in addressing the specific identified issue 920.

The techniques described herein, therefore, provide a single interface for enhanced vehicle ownership experience services. In particular, the techniques herein significantly improve the customer experience and facilitate prevention of damage to vehicles. Moreover, using the telematics data from a customer's vehicle, various feedback, recommendations or enhancements can be provided to the customer, as discussed above.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for processing vehicle ownership support data, the computer system comprising:
    an infrastructure platform comprising a plurality of hardware and software components, infrastructure services, Application Program Interfaces (APIs), and Software Development Kits (SDKs) adapted to communicate in a communication network, the communication network comprising a plurality of web services for interacting with a plurality of vendors, wherein the plurality of vendors includes at least one fuel dispensing apparatus;
    a memory configured to store one or more processes;
    a processor adapted to execute the one or more processes using the infrastructure platform, the processor when executing the one or more processes, is operable to:
    receive telematics data regarding at least one vehicle from at least one of a vehicle device and a cloud-based telematics platform associated with the vehicle wherein the telematics data includes at least one of vehicle identification data, driving performance data, vehicle operation data and vehicle sensor data;
    identify one or more vehicle ownership support services associated with the at least one vehicle, wherein the one or more vehicle ownership support services include fuel dispensing services, and wherein the one or more vehicle ownership support services are accessible using a mobile application at a mobile device associated with the vehicle or a vehicle driver via the infrastructure platform;
    analyze the telematics data associated with the one or more vehicle ownership support services;
    determine a low fuel condition below a predetermined threshold based on analysis of the telematics data;
    determine a location of the vehicle based on at least one of the telematics data and a location of the mobile device associated with the vehicle;
    in response to determining the low fuel condition, identify one or more fuel dispensing stations in proximity to the location of the vehicle;
    provide information related to the one or more fuel dispensing stations to the mobile application;
    determine that the vehicle is within a predetermined distance of one of the one or more fuel dispensing stations;
    in response to determining that the vehicle is within the predetermined distance of one of the one or more fuel dispensing stations, determine a scope of fueling permissions associated with the vehicle identification data at the one of the one or more fuel dispensing stations; and
    automatically initiate a fueling session at the one of the one or more fuel dispensing stations contingent upon the scope of fueling permission.

2. The computer system as recited in claim 1, wherein the plurality of web services comprising a plurality of representational state transfer conforming (RESTful) interfaces.

3. The computer system as recited in claim 2, wherein the infrastructure platform further comprises a push notification interface for providing a plurality of vendor specific notifications related to the vehicle ownership support services to the mobile application.

4. The computer system as recited in claim 3, wherein the processor operable to provide the one or more vehicle ownership support services is further operable to send one or more notifications to the mobile application using the push notification interface based upon at least one of the vehicle sensor data, vehicle operation data and the driving performance data.

5. The computer system as recited in claim 3, wherein the telematics data further comprises vehicle diagnostics data and wherein the processor operable to provide the one or more vehicle ownership support services is further operable to send one or more maintenance notifications associated with the vehicle to the mobile application using the push notification interface based upon the vehicle diagnostics data.

6. The computer system as recited in claim 5, wherein the plurality of vendors comprises a plurality of vehicle repair service providers and wherein the processor is further operable to:
    identify one or more repair needs based on the vehicle diagnostics data;
    estimate repair cost associated with the one or more repair needs based on a data provided by the plurality of vehicle repair service providers; and cause display of the one or more repair needs and the estimated repair cost associated therewith on the mobile device.

7. The computer system as recited in claim 1, wherein the APIs comprise an open authorization application programming interface (Oauth API) configured to provide access of a predefined scope to the telematics data to the mobile application and wherein the processor is further operable to register the mobile application with the infrastructure platform in response to receiving an Oauth authorization request.

8. The computer system as recited in claim 1, wherein the telematics data further comprises trip history data associated with the vehicle, wherein the processor is further operable to cause display of the trip history data on the mobile device.

9. The computer system recited in claim 8, wherein the processor operable to provide the one or more vehicle ownership support services is further operable to filter the trip history data based on a user-specified criteria and further operable to cause display of the filtered trip history data.

10. The computer system as recited in claim 1, wherein the predetermined threshold relates to a remaining amount of fuel.

11. The computer system as recited in claim 1, wherein the predetermined threshold relates to a distance to empty.

12. The computer system as recited in claim 11, wherein the distance to empty is based on fuel consumption related information, the fuel consumption related information is at least a portion of the driving performance data.

13. A method for processing vehicle ownership support data, the method comprising:
    receiving telematics data regarding at least one vehicle from at least one of a vehicle device and a an infrastructure platform, wherein the telematics data includes at least one of a vehicle identification data, driving performance data, vehicle operation data, and vehicle sensor data, wherein the infrastructure platform comprises a plurality of hardware and software components, infrastructure services, Application Program Interacts (APIs) and Software Development Kits (SDKs) adapted to communicate in a communication network, and wherein the infrastructure platform further comprises an application layer of the communications network comprising a plurality of web services for interacting with a plurality of vendors, wherein the plurality of vendors includes at least one fuel dispensing apparatus;
    identifying one or more vehicle ownership support services associated with the at least one vehicle, wherein the one or more vehicle ownership support services comprises providing fuel dispenses services, and wherein the one or more vehicle ownership support services are accessible using a mobile application at a mobile device associated with the vehicle or a vehicle driver via the infrastructure platform;
    analyzing the telematics data associated with the one or more vehicle ownership support services;
    determining a low fuel condition below a predetermined threshold based on analysis of the telematics data;
    determining a location of the vehicle based on at least one of the telematics data and a location of the mobile device associated with the vehicle;
    in response to determining the low fuel condition, identifying one or more fuel dispensing stations in proximity to the location of the vehicle;
    providing information related to the one or more fuel dispensing stations to the mobile application;
    determining that the vehicle is within a predetermined distance of one of the one or more fuel dispensing stations;
    in response to determining that the vehicle is within the predetermined distance of one of the one or more fuel dispensing stations, determining a scope of fueling permissions associated with the vehicle identification data at the one of the one or more fuel dispensing stations; and
    automatically initiating a fueling session at the one of the one or more fuel dispensing stations contingent upon the scope of fueling permission.

14. The method of claim 13, wherein the plurality of web services comprises a plurality of representational state transfer conforming (RESTful) interfaces.

* * * * *